United States Patent [19]

Higa et al.

[11] Patent Number: 5,054,891

[45] Date of Patent: Oct. 8, 1991

[54] LIQUID CRYSTAL SHUTTER WITH SUBSTRATES HAVING AN OPTICAL ANISOTROPY CAUSED BY TEMPERATURE GRADIENT

[75] Inventors: Masakatsu Higa, Fussa; Yasushi Nakajima; Hisashi Aoki, both of Hamura, all of Japan

[73] Assignee: Casio Computer Co., Ltd., Tokyo, Japan

[21] Appl. No.: 339,187

[22] Filed: Apr. 14, 1989

[30] Foreign Application Priority Data

Apr. 15, 1988 [JP] Japan .................................. 63-92713

[51] Int. Cl.[5] ............................................ G02F 1/133
[52] U.S. Cl. ........................................ 359/43; 359/63;
 359/78; 359/82; 359/92; 359/86; 359/93
[58] Field of Search ............. 350/331 R, 331 T, 332,
 350/345, 341, 337, 346, 351, 350 S, 347 E, 347
 R; 340/765, 784, 719; 355/71; 346/160

[56] References Cited

U.S. PATENT DOCUMENTS

| | | | |
|---|---|---|---|
| 4,386,836 | 6/1983 | Aoki et al. | 350/346 |
| 4,569,574 | 2/1986 | Masaki et al. | 350/339 R |
| 4,591,886 | 5/1986 | Umeda et al. | 350/350 S |
| 4,595,259 | 7/1986 | Perregaux | 350/341 |
| 4,609,256 | 9/1986 | Nakamura | 350/346 |
| 4,620,772 | 11/1986 | Sugimoto et al. | 350/337 |
| 4,647,156 | 3/1987 | Fujimura et al. | 350/339 R |
| 4,721,363 | 1/1988 | Inoue | 350/331 T |
| 4,745,433 | 5/1988 | Fujimura et al. | 350/331 R |
| 4,755,812 | 7/1988 | Ohta et al. | 350/331 T |
| 4,767,190 | 8/1988 | Dir et al. | 350/339 R |
| 4,836,654 | 6/1989 | Fujimuna et al. | 350/331 T |
| 4,859,034 | 8/1989 | Shiraishi et al. | 350/331 R |
| 4,893,904 | 1/1990 | Ohta et al. | 350/337 |
| 4,907,859 | 3/1990 | Takada et al. | 350/350 S |

FOREIGN PATENT DOCUMENTS

| | | | |
|---|---|---|---|
| 58-176620 | 10/1983 | Japan . | |
| 59-119330 | 7/1984 | Japan . | |
| 0047933 | 3/1986 | Japan | 350/331 T |
| 61-98323 | 5/1986 | Japan . | |
| 0153834 | 7/1987 | Japan | 350/331 T |
| 0202717 | 8/1988 | Japan | 350/351 |
| 0303320 | 12/1988 | Japan | 350/331 T |

OTHER PUBLICATIONS

Molecular Crystals & Liquid Crystals, vol. 139, No. 1-2, 1986, pp. 143-160, Montreux, CH; M. Nagata et al.: "Liquid Crystal Shutters for Printers", Chapters II, IV.
Patent Abstracts of Japan, vol. 8, No. 245 (P—312)[1682], 10th Nov. 1984; Japanese P—A—59 119 330 (Canon (K.K.) 10-07-1984.

*Primary Examiner*—Stanley D. Miller
*Assistant Examiner*—Tai V. Duong
*Attorney, Agent, or Firm*—Frishauf, Holtz, Goodman & Woodward

[57] ABSTRACT

A liquid crystal shutter comprising a light source, a liquid crystal element including a pair of substrates and liquid crystal interposed between the substrates, a pair of polarizing plates formed on the outer surfaces of the substrates, and a heater for heating the liquid crystal element. At least one electrode is formed on the inner surface of either substrate, and an aligning orientating layer is formed on the electrode and the inner surface of the substrate. The polarizing axis of at least one of the polarizing plates extends either parallel or at right angles to the direction of the optical axis of a substrate having an optical anisotropy caused by a temperature gradient created over the liquid crystal element in a direction toward a periphery from a center of the liquid crystal element heated by the heater, and crossing at a certain degree with an arrangement direction of liquid crystal molecules oriented by the aligning orienting layer.

20 Claims, 10 Drawing Sheets

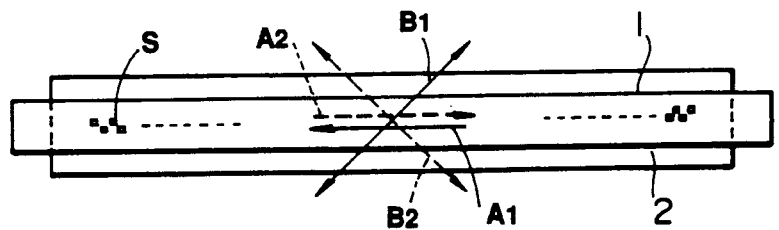
FIG.1 *(PRIOR ART)*
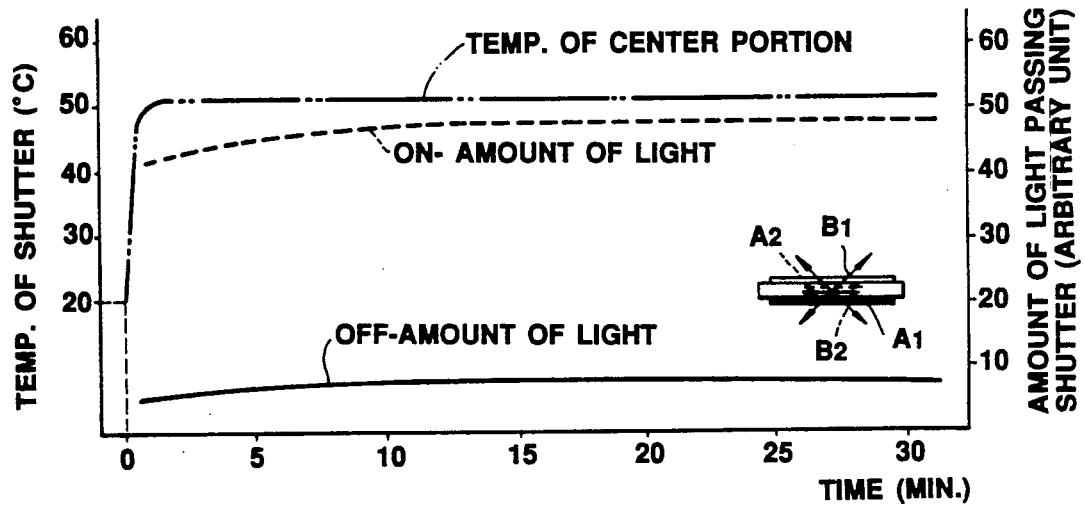
FIG.2 *(PRIOR ART)*
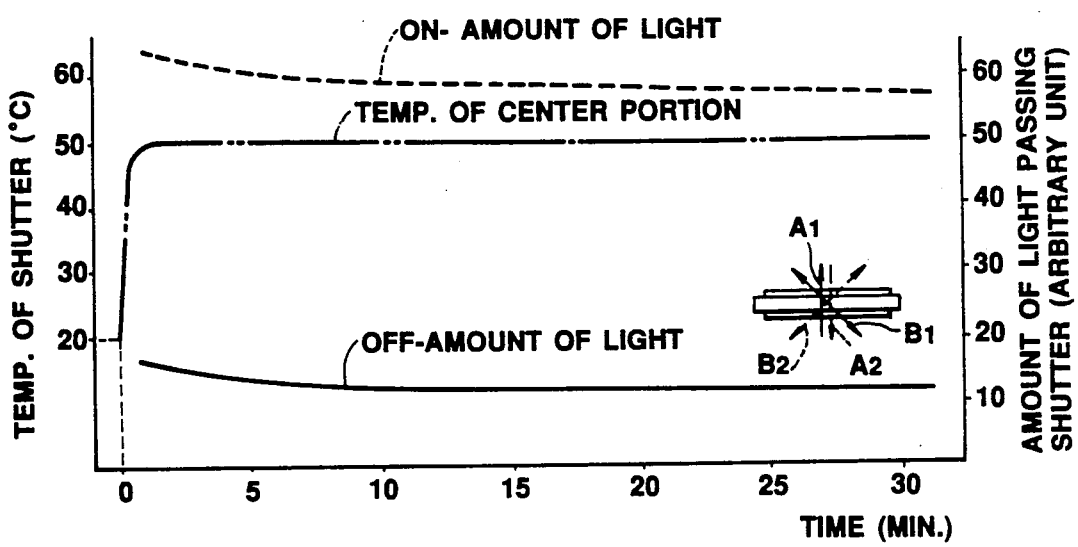
FIG.3 *(PRIOR ART)*

LIQUID CRYSTAL SHUTTER WITH SUBSTRATES HAVING AN OPTICAL ANISOTROPY CAUSED BY TEMPERATURE GRADIENT

BACKGROUND OF THE INVENTION

1. Field of the Invention

The present invention relates to a liquid crystal (LC) shutter.

2. Description of the Related Art

In recent years, an LC shutter has come into use in an electro-photographic printer or the like, as a light-controlling element for transmitting and shielding light.

The LC shutter comprises a first substrate, a second substrate located parallel to the first substrate, a layer of LC material sealed in the gap between the first and second substrates, and a pair of polarizing plates formed on the outer surfaces of the two substrates, respectively. The shutter further comprises a number of small signal electrodes aligned in one direction on the inner surface of the first substrate, a common electrode formed on the inner surface of the second substrate, and aligning films formed on the signal electrodes and the common electrodes. Those portions of the layer of LC material, which are located between the common electrode and the signal electrodes, function as microshutters for transmitting and shielding light.

Various types of LC shutters are known. U.S. Pat. No. 4,386,836 discloses a TN (Twisted Nematic) LC shutter. U.S. Pat. No. 4,745,433 discloses a G.H. (Guest-Host) LC shutter. U.S. Pats. No. 4,569,574 and No. 4,595,259, and Japanese Patent Disclosure No. 58-176620 disclose a birefringent LC shutter. Further, U.S. Pat. No. 4,591,886 discloses a ferroelectric LC shutter. Of these types, the birefringent LC shutter attracts much attention for two reasons. First, it can transmit a great amount of ON light, thus displaying a high-contrast image. Secondly, it can respond to drive signals at high speed. The ferroelectric LC shutter attracts much more attention, because it can respond to drive signals, theoretically, at much higher speed.

For the above reason, studies are being made on the possibility of using these types of LC shutters as the light-controlling element in electro-photographic printers.

In the birefringent LC shutter or the ferroelectric LC shutter, the LC layer is sealed between the substrates, and molecules of the LC layer are orientated in a desired direction uniformly. The polarizing plates are arranged such that their polarizing axes (either the light-transmitting axes or the light-absorbing axes) extend parallel or at right angles. At least one of the polarizing axes intersects with a direction in which the molecules of LC material are orientated. When an electric field is applied to the LC material, the birefringence of the LC layer changes, whereby the light passing through the output polarizing plate is controlled. In short, either the birefringent LC shutter or the ferroelectric LC shutter is a birefringent effect type LC element which can transmit and shield light by virtue of its birefringence effect.

The LC shutter used as light-controlling element in an electro-photographic printer comprises two rectangular substrates located parallel to each other, and liquid crystal material sandwiched between the substrates and a number of microshutter elements are arranged in a line or more, in a predetermined direction. The opposing inner surfaces of the substrates are subjected to an aligning treatment such that the molecules of liquid crystal material are orientated in the predetermined direction. More specifically, these surfaces of the substrates are covered by aligning films, these aligning films are rubbed in the lengthwise direction of the substrates. Two polarizing plates are formed on the outer surfaces of the substrate, respectively. These polarizing plates are positioned such that the polarizing axis of at least one of the plates intersects, at a desired angle, with the direction of the LC layer.

FIG. 1 is a plan view showing a conventional LC shutter utilizing the birefringence effect. This figure shows directions of aligning treatment of the substrates, and also the light-transmitting axes of the polarizing plates of this LC shutter. In FIG. 1, the directions of the aligning treatments of the upper and lower substrates 1 and 2 are shown by arrows A1 and A2. Light-transmitting axes of the polarizing plates B1 and B2 are shown by arrows, respectively. The directions A1 and A2 are parallel to the axis of the LC shutter, and the axes B1 and B2 intersect with each other at right angles and with the directions A1 and A2 at 45°, respectively. Alternatively, the directions A1 and A2 can be at right angles to the axis of the shutter, and the light-transmitting axes B1 and B2 can be parallel to each other.

The LC shutter illustrated in FIG. 1 is irradiated with light from a light source, and controls the light emitted from a light source, transmitting or shielding the light. The shutter is heated by the light to a temperature higher than the ambient temperature. Naturally, the LC material is heated. The operating characteristic of the LC shutter depends on the temperature of the LC material. To stabilize the operation characteristic, it is necessary to maintain the LC material at an optimal temperature. To this end, heaters are located along the array of shutter elements, on both sides of the array. When the temperature of the shutter elements is too low, the heaters are turned on to heat the elements to the optimal value.

When the temperature of the material rises, the amount of light the shutter transmits in the ON state (hereinafter called "ON-amount of light"), and the amount of light the shutter transmits in the OFF state (hereinafter called "OFF-amount of light") change, despite the use of the heaters. Hence, the contrast of the image formed by the LC shutter decreases.

This problem inherent in the conventional LC shutter will be discussed in greater detail, with reference to FIGS. 2 and 3. FIGS. 2 and 3 are graphs representing the relationship which the ON-amount of light and the OFF-amount of light, on the one hand, and the temperature of the center portion of the LC shutter shown in FIG. 1, on the other, have when heaters are used to maintain the LC shutter at 50° C., while the ambient temperature is 20° C. FIG. 2 is a graph illustrating the operating characteristic of a conventional LC shutter, wherein the directions A1 and A2 are parallel to the direction in the shutter elements are arranged, and the polarization axes B1 and B2 intersect at 45° with this direction. Either LC shutter of FIGS. 2 and 3 are driven in the ½ duty, double-frequency addressing scheme. The shutter elements of the LC shutter remain in the ON state (i.e., the light-transmission state) as long as an ON electric field and an OFF electric field are alternately applied to them. The shutter elements goes into an OFF state (i.e., the light-shielding state) when the OFF electric field is continuously applied to them. As can be understood from FIGS. 2 and 3, the operating characteristic of either LC shutter becomes stable when the center portion is heated by the heaters to 50° C. upon lapse of a specific time. In the case of the shutter wherein the directions A1 and A2 are parallel to the direction in which the shutter elements are aligned, and the polarizing axes B1 and B2 intersect at 45° to this direction, the ON-amount of light and the OFF-amount of light increase with time and become stable upon lapse of about 20 minutes after the temperature of the shutter has risen to 50° C., as is evident from FIG. 2. In the case of the shutter wherein the directions A1 and A2 intersect at right angles with the direction in which the shutter elements are aligned, and the polarizing axes B1 and B2 intersect at 45° to this direction, the ON-amount of light and the OFF-amount of light decrease with time and become stable upon lapse of about 20 minutes after the temperature of the shutter has risen to 50° C., as is evident from FIG. 3.

As is evident from FIGS. 2 and 3, in either type of the LC shutters, the OFF-amount of light changes with time and the ON-amount of light changes along with the OFF-amount of light since the shutter elements remain in the ON state as long as an ON electric field and an OFF electric field are alternately applied to them. Further, in either LC shutter, the OFF-amount of light varies with the ambient temperature.

As has been described above, the conventional LC shutter which make use of the birefringence effect of LC material is disadvantageous in that the OFF-amount of light changes with the ambient temperature despite that the center portion of the shutter is maintained at a predetermined temperature.

SUMMARY OF THE INVENTION

The inventors hereof have conducted experiments in search of a solution to the problem inherent in the conventional LC shutters utilizing the birefringence effect of LC material. They have found that the OFF-amount of light changes because the temperature gradient occurs in the widthwise direction of either rectangular substrate, and the substrate becomes anisotropic in terms of birefringence though it is made of glass which is isotropic in terms of birefringence. Accordingly, it is the object of the present invention to provide a LC shutter in which the ON-amount of light or the OFF-amount of light little changes in spite of the changes in the ambient temperature, and which can thus operate very stably.

According to the invention, there is provided a liquid crystal shutter comprising: a liquid crystal element having a first substrate, a plurality of first electrodes formed on one surface of the first substrate, first aligning means formed on the electrodes, a second substrate located parallel to the first substrate, at least one second electrode formed on that surface of the second substrate which opposes at least one of the first electrode, second aligning means formed on the second electrodes, and liquid crystal material sealed between the gap between the first and second substrates; light source means for applying light to the liquid crystal element; heating means for heating the liquid crystal element; and a pair of polarizing means arranged outside said liquid crystal material, such that the polarizing axis of at least one of the polarizing means is arranged to be substantially parallel or at right angle to the direction of temperature gradation occurring when the liquid crystal element is heated by the heating means.

Since at the polarizing axis of at least one of the substrates is parallel or at right angles to the direction of the optical anisotropy which the substrates have due to the temperature gradient in their widthwise direction, the polarized light passing through this polarizing plate is scarcely influenced by the optical anisotropy of the substrates. As a result, the OFF-amount of light changes little in spite of the variation of the ambient temperature. Hence, the LC shutter according to the present invention performs a very stable operation.

BRIEF DESCRIPTION OF THE DRAWINGS

FIG. 1 is a plan view schematically showing a conventional LC shutter:

FIGS. 2 and 3 are graphs, each representing how the ON-amount of light and OFF-amount of light of a conventional LC shutter changes with time, when the center portion of the LC shutter is maintained at a predetermined temperature;

DETAILED DESCRIPTION OF THE PREFERRED EMBODIMENTS

Embodiments of the present invention will now be described, with reference to the accompanying drawings.

First, the principles of the invention will be explained, with reference to FIGS. 4 and 5. These figures are identical to FIGS. 2 and 3, except that they show how the temperature of the longer edge portions of the LC shutters varies with time.

Figure 4:
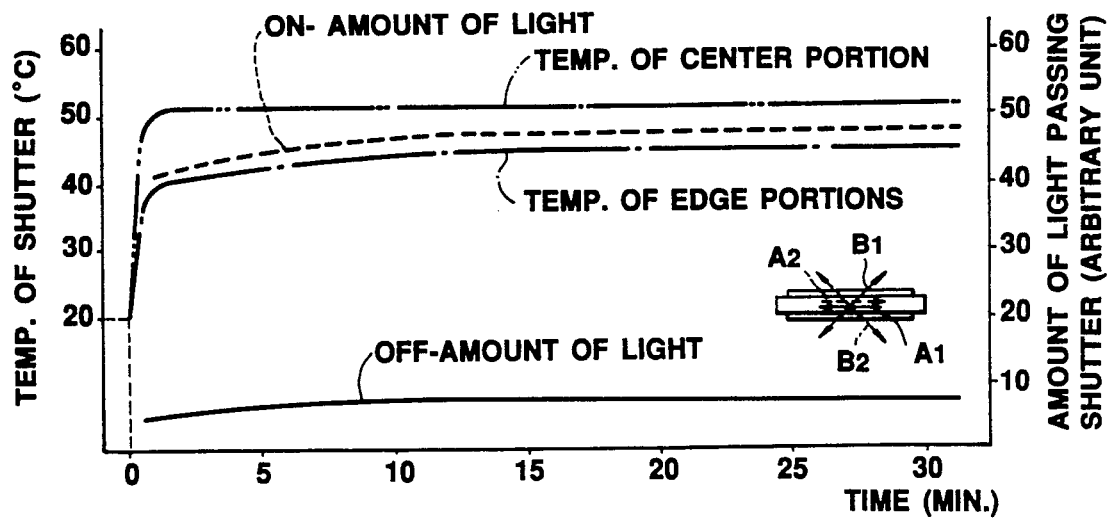
FIGS. 4 and 5 are graphs for explaining the principles of the present invention.
Figure 5:
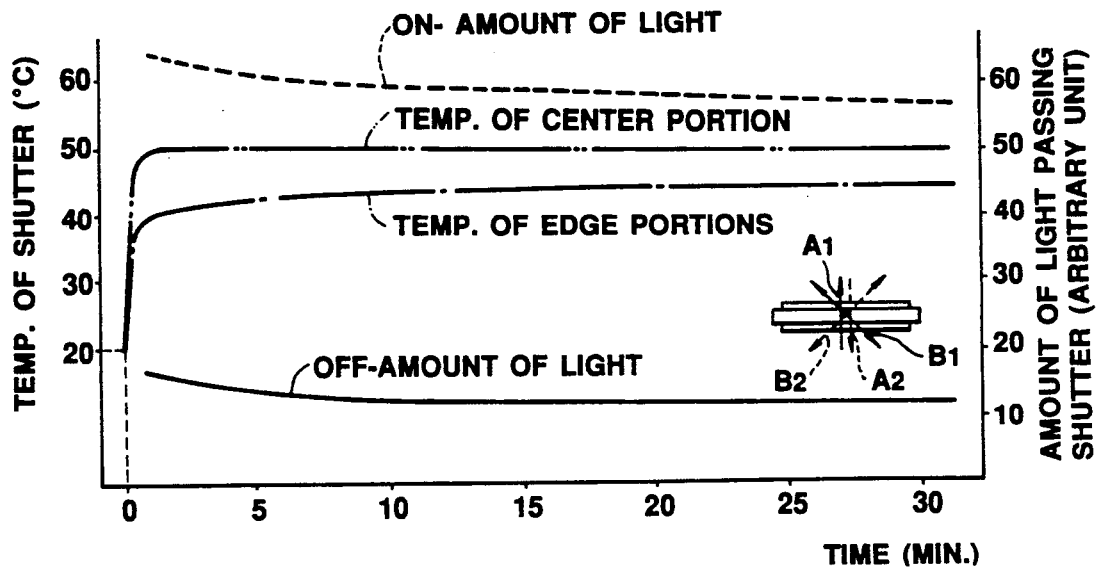

As is evident from FIGS. 4 and 5, in the LC shutter, the temperature of the longer edges is lower than that of the center portion. As can be seen also from these figures, the difference in temperature between the center portion and the edge portions gradually changes with time. Further, as can be understood from these figures, the ON-amount of light (an amount of the transmitting light when the shutter is on state) and the OFF-amount of light (an amount of the transmitting light when the shutter is OFF state) change in accordance with the temperature difference between the center portion and the edge portions In the case of the LC shutter, wherein the directions A1 and A2 are opposite and parallel to the direction in which segment electrodes are arranged, and the polarizing axes B1 and B2 of the polarizing plates extend at 45° to this direction the OFF-amount of light decreases according to the temperature difference between the center portion and the edge portions, as is shown in FIG. 4. Also as is shown in FIG. 4, the ON-amount of light decreases as the OFF-amount of light decreases to hold the LC shutter in the ON state as long as the ON electric field and the OFF electric field are being alternately applied to the shutter elements Conversely, in the case of the LC shutter, wherein the directions A1 and A2 intersect at right angles to the direction in which segment electrodes are arranged, and extend at 45° to the polarizing axes B1 and B2 of the polarizing plates, the OFF-amount of light increases according to the temperature difference between the center portion and the edge portions, as is shown in FIG. 5. Further, as is shown in FIG. 5, the ON-amount of light increases as the OFF-amount of light does.

In other words, it can be said that in the LC shutters, the OFF-amount of light increase in accordance with the temperature gradient between the center portion and the edge portions of the shutter.

Figure 6:
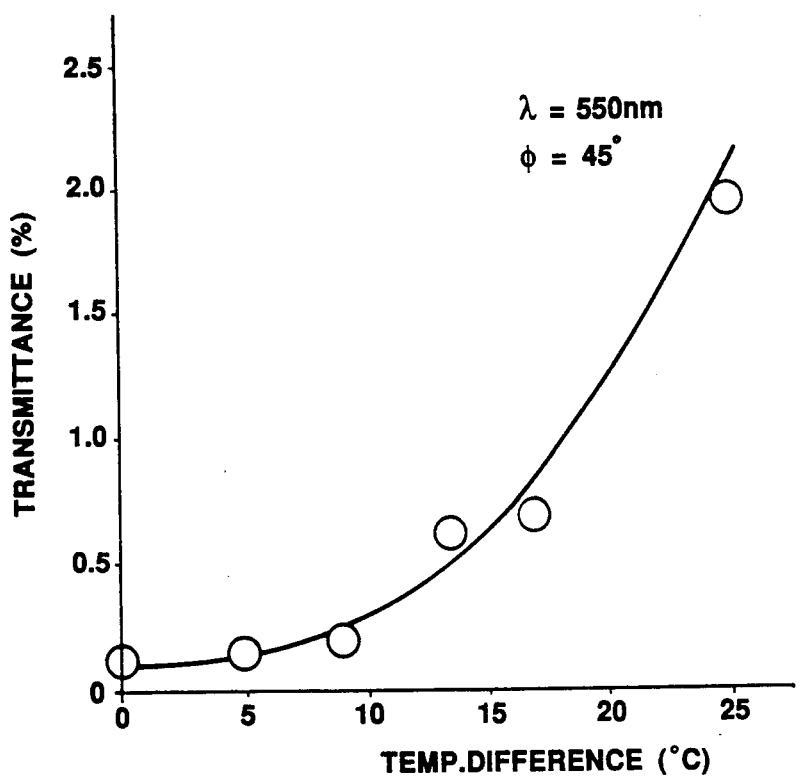
FIG. 6 is also a graph illustrating how the light-transmittance of a LC shutter changes with the difference between in temperature between the center portion and the edge portions.

It will now be explained how the light transmittance of the LC shutter varies with the temperature gradient, with reference to FIG. 6. FIG. 6 represents how the light-transmittance of 550 μm wavelength changes with the temperature difference between the center portion and the edge portions, in the LC shutter, wherein the light-transmitting axes B1 and B2 intersect at 45° to the axis of the shutter as is shown in FIG. 1, when no LC material is contained in this LC shutter. The substrates 1 and 2 of the LC shutter have the same thickness of 700 μm. The upper substrate 1 has a size of 6 mm × 240 mm, and the lower substrate 2 has a size of 17 mm × 229 mm. These substrates are located parallel, and spaced apart for 4.15 μm, thus forming a gap between them. When the center portion of this LC shutter is maintained at 50° C., and the ambient temperature is 5° C., the temperature at the edge portions is about 30° C. In this instance, the temperature difference between the center portion and the edge portions is about 20° C.

As shown in FIG. 6, the light-transmittance of this LC shutter increases as the temperature difference between the center portion and the edge portions becomes greater. This means that the upper substrates 1 and 2 have retardation. The light-transmittance T of the LC shutter, in which the light-transmitting axes B1 and B2 of the polarizing plates intersect with each other at right angles, is given as follows:

$$T = \frac{T_{//}^2}{2} \sin^2(2\phi) \sin^2\left(\frac{\pi \Delta n_G \cdot d_G}{\lambda}\right) + T_\perp \cdot T_{//} \quad (1)$$

where:

$\Delta n_G$: birefrinence index of the glass substrate $d_G$: thickness of the substrate (700μm × 2)

$\lambda$ : wavelength of incident light (550 nm)

Figure 7:
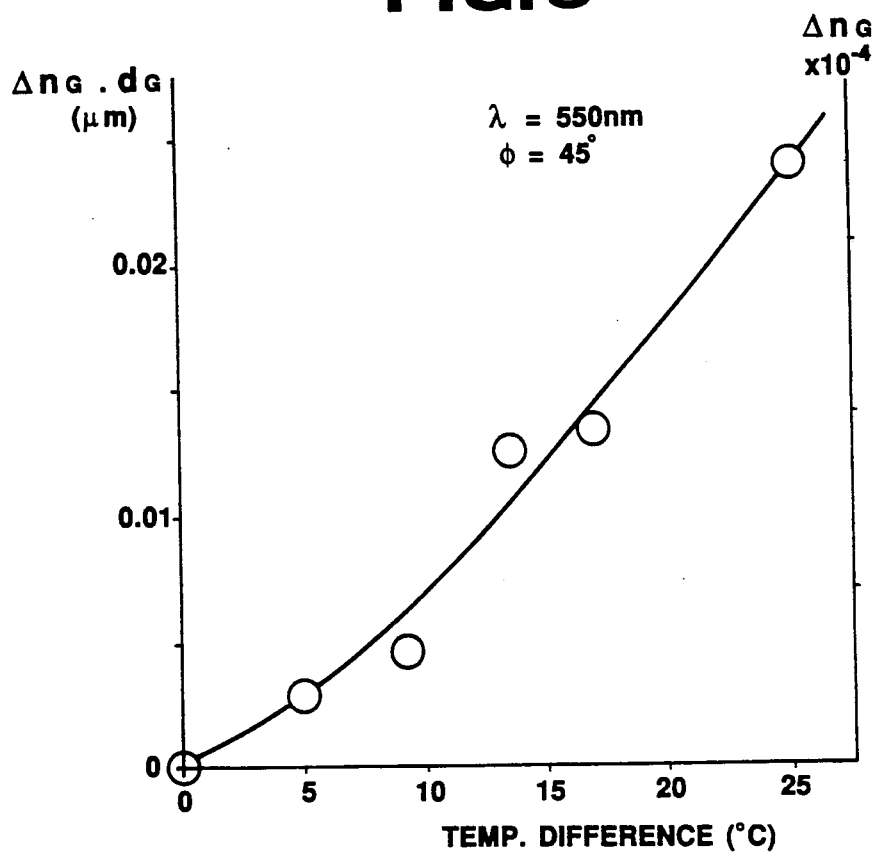
FIG. 7 is a graph representing how the value $n_G d_G$ of each LC shutter cell varies with the difference between in temperature between the center portion and the edge portions.

$\phi$ : angle between the light-transmitting axes of the polarizing plates and the longer axis of the shutter $T_{//}$ : transmittance to the light polarized in the axes of the polarizing plates $T_\perp$: transmittance to the light polarized in the light-absorption axes of the polarizing plates FIG. 7 shows the retardation $\Delta n_G \cdot d_G$ of the substrates and the birefringence index of the substrate, obtained by equation (1) based on results shown in FIG. 6. This is because the retardation $\Delta n_G \cdot d_G$ of the substrates is added to or subtracted from the retardation $\Delta n_{LC} \cdot d_{LC}$ of the LC material contained in the shutter. Thus, the retardation $n_G \cdot d_G$ of the substrates influences the operating characteristics of the LC shutter, particularly when the shutter is in the OFF state.

Figure 8:
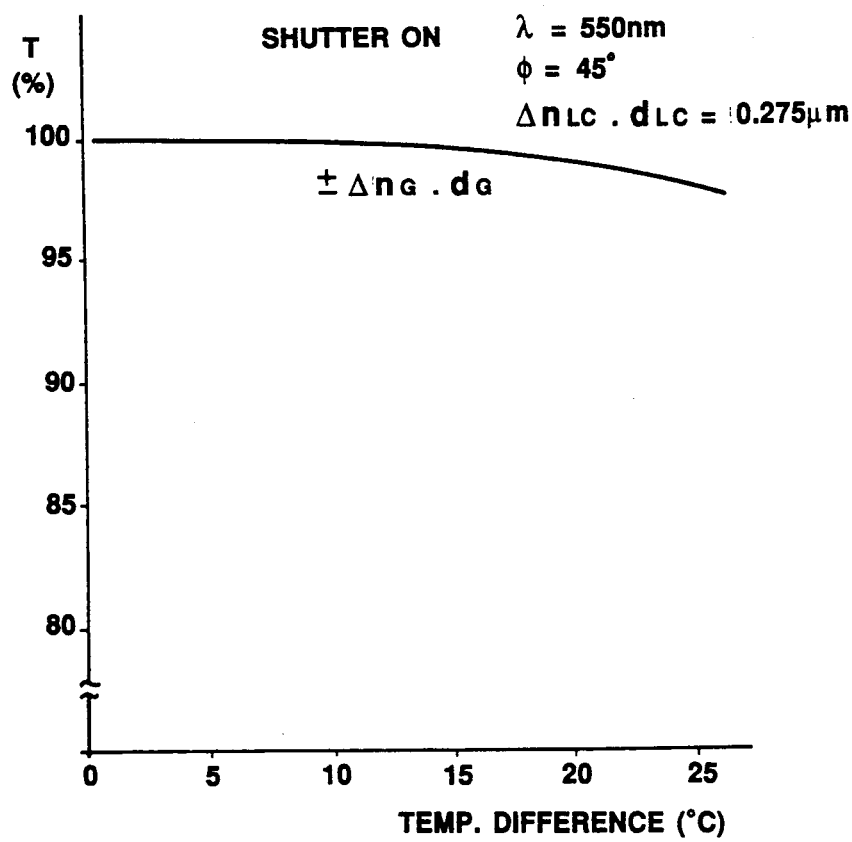
FIG. 8 is a graph showing how the OFF-amount of light varies with the difference in temperature between the center portion and the edge portions, when influenced by the variation of the value $n_G d_G$.
Figure 9:
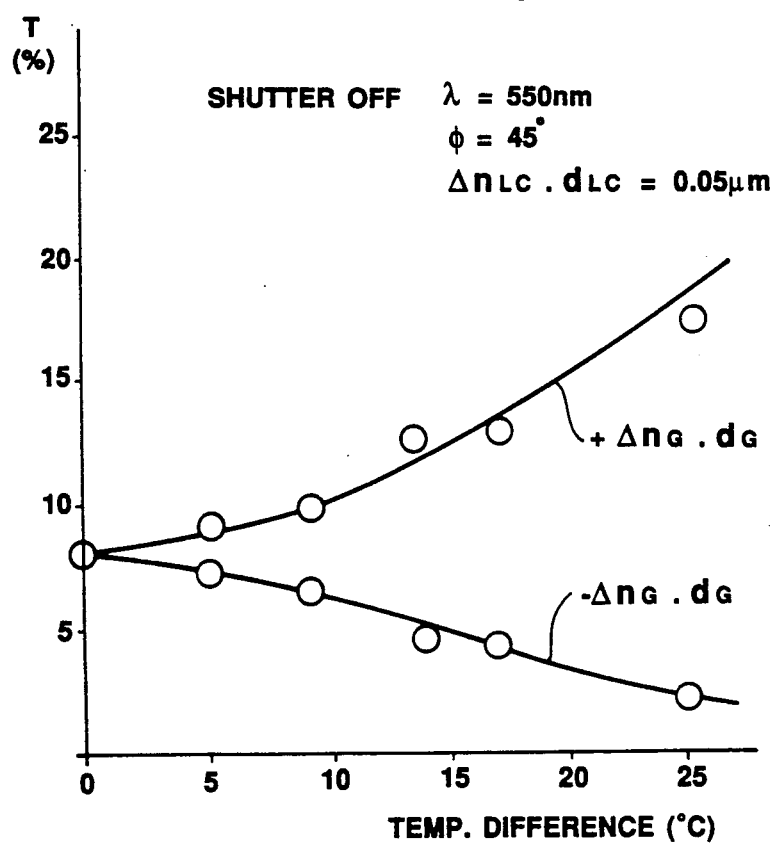
FIG. 9 is a graph showing how the ON-amount of light varies with the difference in temperature between the center portion and the edge portions, when influenced by the variation of the value $n_G d_G$.

FIGS. 8 and 9 show how the light-transmittance T of a LC shutter varies with the temperature difference between the center portion and the edge portions of a LC shutter in which the directions A1 and A2 are either parallel or at right angles to the axis of the shutter, and the light-transmitting axes B1 and B2 intersect with the axis of the shutter at 45°, and value of retardation $\Delta LC \cdot d_{LC}$ is 0.05 μm when the molecules of the LC material are orientated homeotropically. More precisely, FIG. 8 shows the how T varies with the temperature difference and how it is influenced by the retardation $\Delta n_G \cdot d_G$ of the substrates, while the shutter remains open. FIG. 9 shows the how T varies with the temperature difference and how it is influenced by the retardation $\Delta n_G \cdot d_G$ of the substrates, while the shutter remains closed. The characteristics of FIGS. 9 and 8 are obtained by driving the shutter elements with static driving method As can be understood from FIG. 8, when the shutter opens, the transmittance T varies a little in accordance with the temperature difference. As is evident from FIG. 9, when the shutter is closed the retardation $\Delta n_G \cdot d_G$ of the substrates 1 and 2 acts negatively, thus decreasing the light-transmittance T, as is evident from curve $\Delta n_G \cdot d_G$, in the LC shutter in which the directions A1 and A2 are parallel to the axis of the shutter. As is evident from FIG. 9, the retardation $\Delta n_G \cdot d_G$ acts positively, thereby increasing the light-transmittance T as is evident from curve $+\Delta n_G \cdot de$ in the LC shutter in which the directions A1 and A2 intersect at right angles to the axis of the shutter. In either instance, the light-transmittance T can be given:

$$T = \frac{T_{//}^2}{2} \sin^2(2\phi) \sin^2\left(\frac{\pi \delta_G}{\lambda}\right) + T_\perp \cdot T_{//} \quad (2)$$

where $\delta = n_{LC} \cdot d_{LC} \pm n_G \cdot d_G$.

In FIGS. 8 and 9, the maximum value (100%) for the light-emittance T is $T_{//}^2/2$. In experiments, $2T/T_{//}$ is 0.12%.

Figure 10:
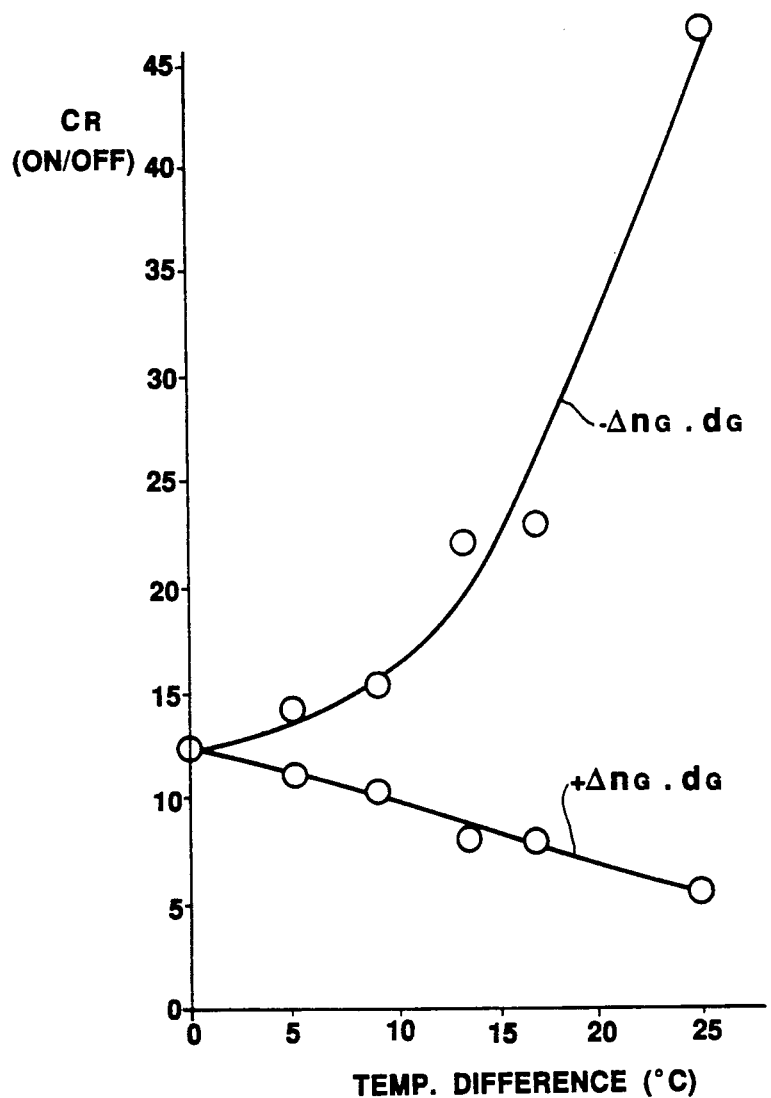
FIG. 10 a graph showing how the contrast of the image formed by using the LC shutter varies with the difference in temperature between the center portion and the edge portions, when influenced by the variation of the value $n_G d_G$.

FIG. 10 is a graph illustrating how the contrast of the image formed by the LC shutter varies with the temperature difference. As shown in FIG. 10, the contrast obtained when the retardation $\Delta ng \cdot dG$ acts negatively is different from that obtained when the retardation $\Delta n_G \cdot dG$ acts positively.

As has been discussed, when the LC material used in the conventional LC shutter is heated by a heater and/or by the light emitted from a light source, temperature gradient occurs in the widthwise direction of the substrates (i.e., in the direction crossing at right angles to the direction in which the shutter elements are aligned) because there is a temperature difference between the center portion and the edge portions of the shutter. Due to this temperature gradient, the substrates has a birefringence index which is anisotropic in the length-wise and widthwise directions. The anisotropic birefringence adversely influences the the light-transmittance which the LC shutter achieves in either state, i.e., the ON state or the OFF state.

Generally, glass substrates, which have isotropic, are used in LC shutters. The birefringence index which either substrate has due to the temperature gradient is certainly far less than that of the LC material, but it is great enough to change the retardation of the light passing through the LC shutter since either substrate is much thicker than the layer of the LC material. Hence, in the conventional LC shutter, wherein direction of the aligning treatment of the substrates is parallel to or at right angles to the direction in which segment electrodes are aligned, and wherein the polarizing plates are positioned in accordance with the director of LC layer in which the molecules of LC material are aligned by the aligning treatment, both the ON-amount of light and the OFF-amount of light inevitably change when the substrates have a temperature gradient resulting form changes in the ambient temperature and become anitosropic in terms of birefringence index, whereby the linearly polarized light is converted to the elliptically polarized light by the birefringence of the substrates.

The LC shutter according to this invention is characterized in two respects. First, at least one of the light-transmitting axis B1 of the light-receiving side polarizing plate formed on the outer surface of the first substrate is substantially at right angles to the direction of the temperature gradient resulting from the temperature difference between the center portion and the edge portions of the shutter (or, substantially parallel to the direction in which the shutter elements are aligned), and the light-transmitting axis B2 of the light-emitting side polarizing plate formed on the outer surface of the second substrate intersects with the axis B1 substantially at right angles Second, the directions A1 and A2 of aligning treatments of the substrates intersect at 45° with the axes B1 and B2, respectively. Since the transmitting, axis B1 of the light-receiving side polarizing plate is substantially at right angles to the direction of the temperature gradient, the linearly polarized light passing through the light-receiving side polarizing plate enters the layer of the liquid crystal material, without undergoing the influence of birefringence. For the same reason, when the LC shutter is in the OFF state, the light passing through the layer of the LC material and also through the second substrate without undergoing the influence of birefringence can be shielded almost completely by the light-emitting polarizing plate. Therefore, neither the ON-amount of light nor the OFF-amount of light changes at all.

Figure 11:
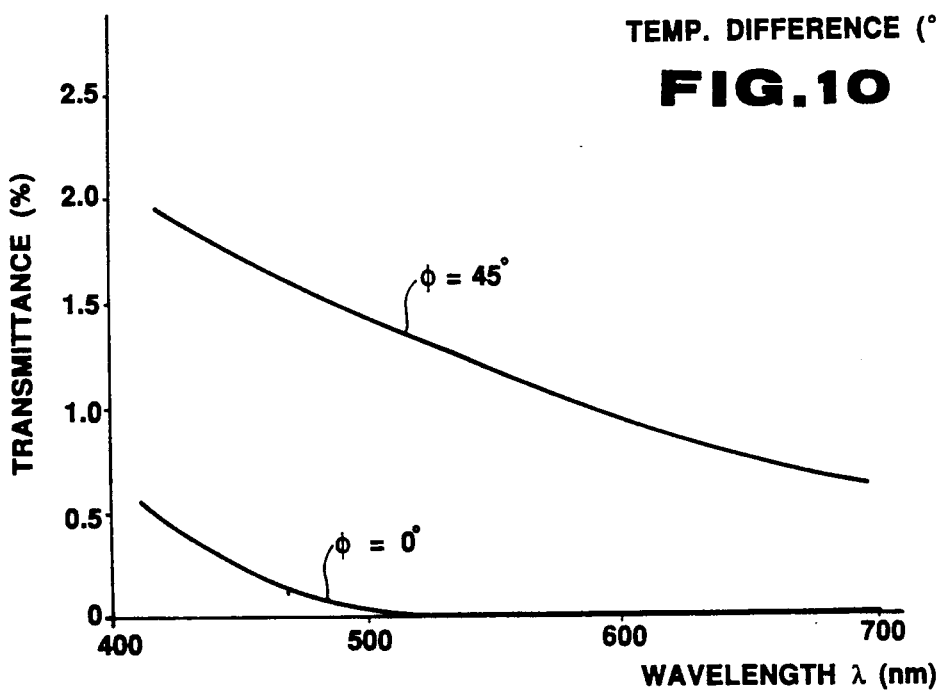
FIG. 11 is a spectrum diagram showing the spectral distribution which the conventional LC shutter, wherein $\phi$ is 45, is exhibits in the OFF state, and also the spectral distribution which the LC shutter according to the present invention, wherein $\phi$ is 0, exhibits in the OFF state.

FIG. 11 represents the relationship between the light-transmittance and the wavelength of the light applied to the LC shutter, wherein no LC material is sealed, the light-transmitting axes B1 and B2 of the polarizing plates intersect at $\phi=45°$ with the longer axis of the LC shutter. FIG. 11 also shows the relationship between the light-transmittance and the wavelength of the light applied to the LC shutter, wherein no LC material is sealed, the axes B1 and B2 of the polarizing plates intersect at $\phi=0°$ with the longer axis of the LC shutter. As is evident from FIG. 11, the transmittance is relatively great to the light having a wavelength of 500 $\mu m$ or more in the LC shutter, wherein the axes B1 and B2 of the polarizing plates intersect at 45° with the axis of the LC shutter. In contrast, the transmittance is almost 0% to the light having a wavelength of 500 nm or more in the LC shutter, wherein the axes B1 and B2 of the polarizing plates intersect at 0° with the axis of the LC shutter. In this LC shutter, ON-amount of light and the OFF-amount of light are scarcely influenced by the birefringence anisotropy of the substrates.

An LC shutter according to the invention, which is used in an electro-photographic printer, will now be described with reference to FIG. 12 through FIG. 19.

Figure 12:
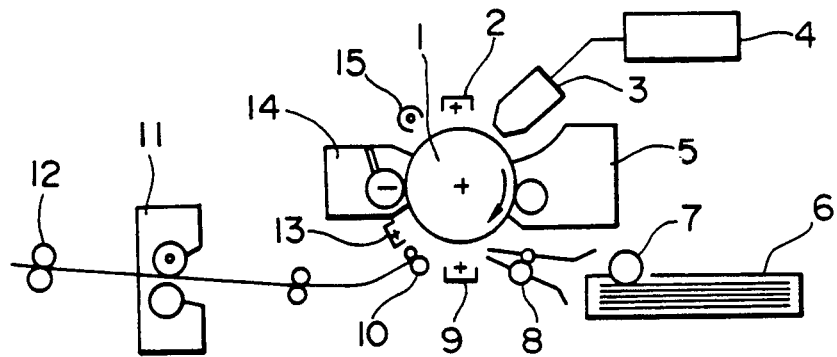
FIG. 12 is a diagram schematically showing a LC printer in which the LC shutter according to the invention is used.
Figure 13:
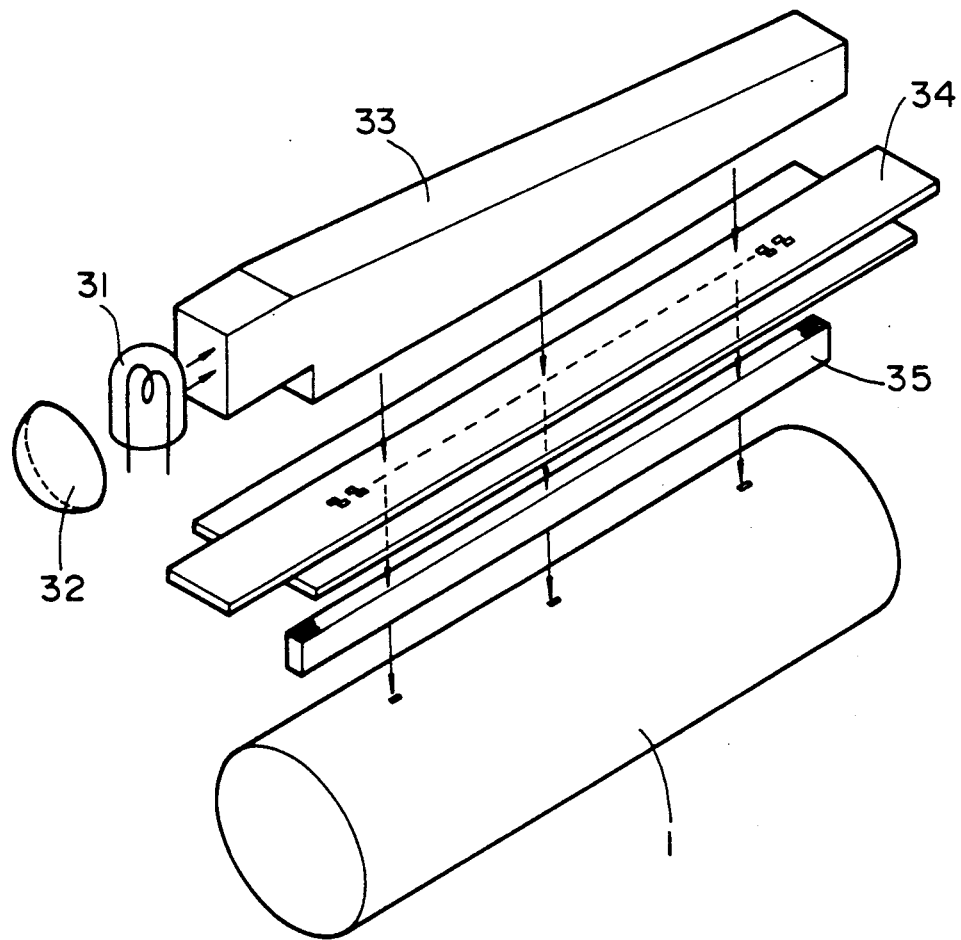
FIG. 13 is a perspective view showing the optical recording section of the LC printer shown in FIG. 12.

FIG. 12 is a cross-sectional view schematically showing the electro-photographic printer. As is illustrated in this figure, the printer comprises a photoconductive, photosensitive drum 1, a charger 2 for uniformly charging the surface of the drum 1, an optical recording section 3 for optically recording data on the surface of the drum 1, and a control section 4 for driving the optical recording section 3. As is shown in FIG. 13, the optical recording section 3 comprises a light source 31, a reflector 32, a light guide 33 for distributing the light from the light source 31 uniformly in the lengthwise direction of the drum 1, the LC shutter 34 according to the invention, and a focusing lens 35. The light source 31 includes a hologen lamp for emitting unpolarized light. The light guide 33 is designed to apply the light from the light source 31, uniformly to the drum 1. The section 3 is driven by a control section 4 in accordance with the data to be recorded, such as image data. The section 3 applies light to the surface of the drum 1, thereby electrically discharging the surface and forming an electrostatic latent image thereon. This latent image is developed into a toner image by means of developer located near the surface of the drum 1.

Sheets 6 of recording paper are fed toward the drum 1 by a paper-feeding roller 7, one by one. Any sheet 6 thus fed is stopped by a stand-by roller 8. The standby roller 8 feeds the sheet 6 to a image transfer section 9 at the same speed as the toner image moves as the drum 1 is rotated. In the image transfer section 9, the toner image is transferred from the drum 1 to the sheet 6 which is in contact with the surface of the drum 1. The sheet 6 is removed from the drum 1 by means of a sheet-separating section 10. The toner image is fixed on the sheet 6 by an image-fixing device 11. The sheet 6 is then supplied out of the printer by means of a roller 12. In the meantime, a discharger 13 neutralizes the toner charge on the surface of the drum 1. A cleaner 14 removes the residual toner from the surface of the drum 1. At the same time, an eraser 15 neutralizes the electrical charge on the surface of the drum 1.

The light source 31 of the optical recording section 3 is a halogen lamp, and applies light to one end of the light guide 33. The light guide 33 distributes the light uniformly, owing to the internal reflection, and applies it to the LC shutter 34. The light is not polarized at all and uniform in intensity over the entire length of the LC shutter 34.

The LC shutter 34 is of the birefringent type, and will be described in detail, with reference to FIGS. 14 to 16.

Figure 14:
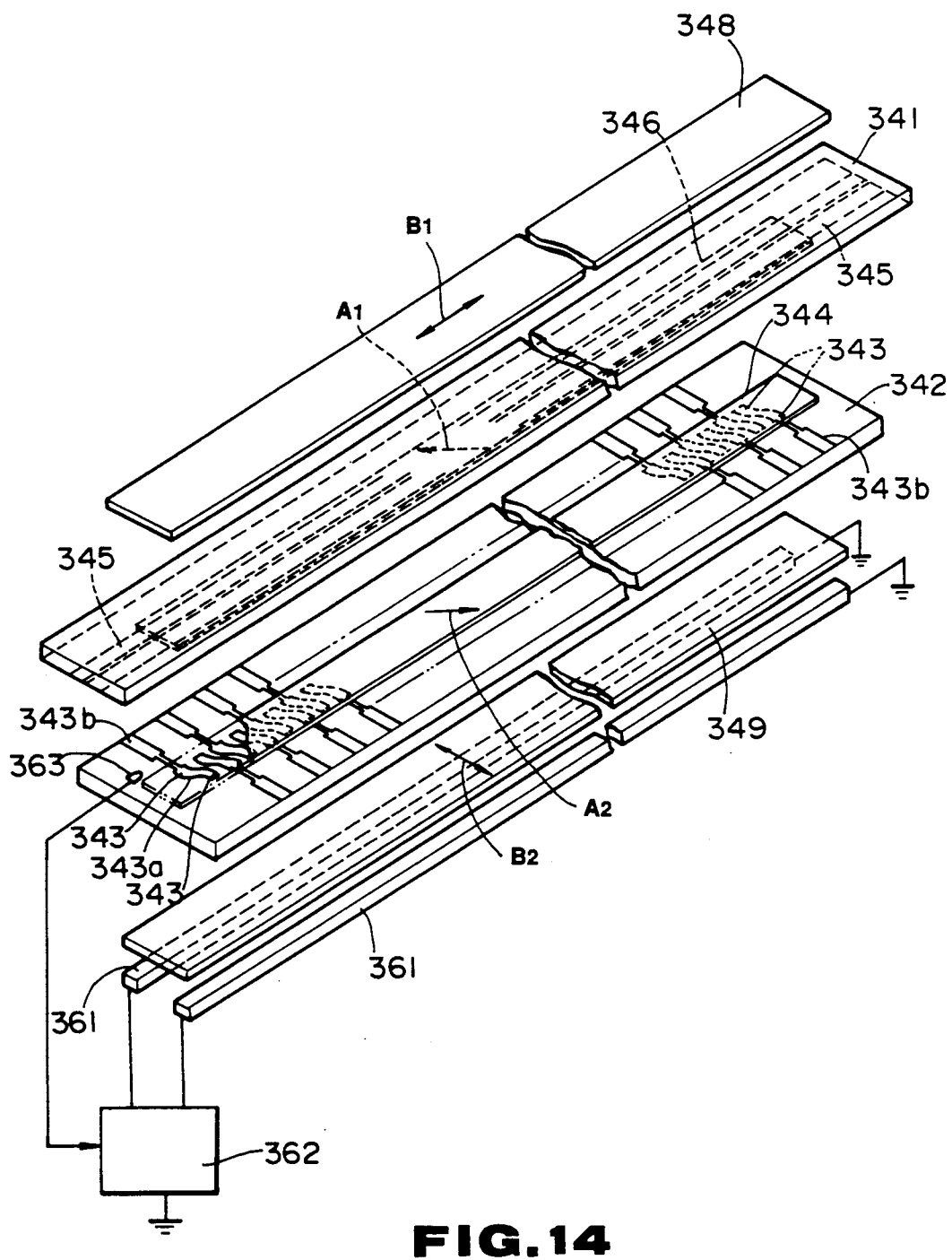
FIG. 14 is a perspective view showing the LC shutter according to the present invention.
Figure 15:
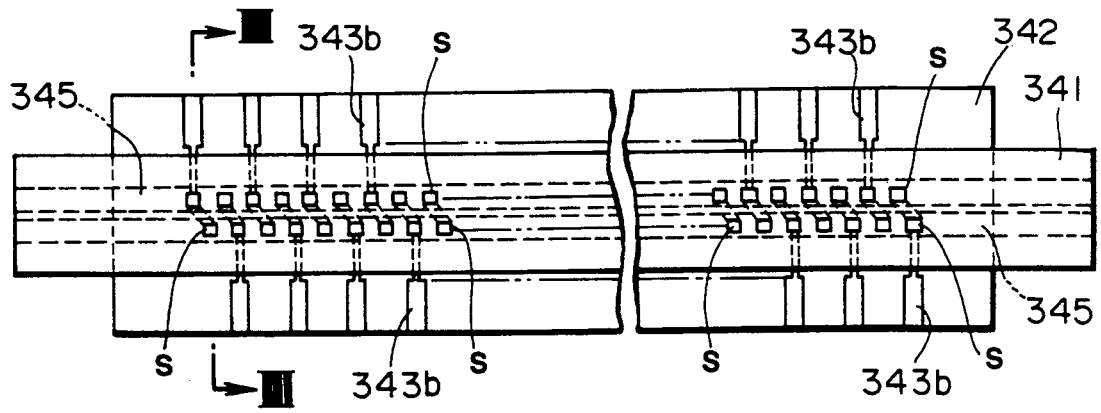
FIG. 15 is a plan view of the LC shutter shown in FIG. 14.
Figure 16:
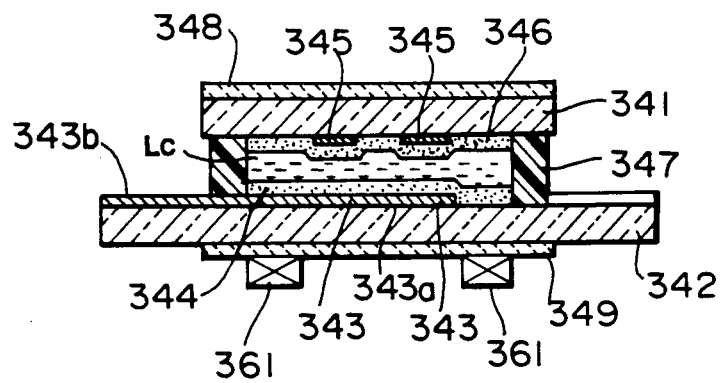
FIG. 16 is a sectional view of the LC shutter shown in FIG. 14.

As is illustrated in FIGS. 14 to 16, the LC shutter 34 comprises a pair of elongated, transparent substrates 341 and 342, located parallel to each other and one above the other. A number of tiny, transparent, segment electrodes 343 are formed on the lower substrate 342, arranged in two lines along the lengthwise direction of the substrate 342. The electrodes arranged in the first line, are staggered by half their width with respect to the electrodes arranged in the second line. Each electrode arranged in the first line is connected by connector 343a to the adjacent electrode arranged in the second line. The electrode 343 arranged in the first line is connected by a lead a terminal 343b which is formed on the edge portion of the lower substrate 342 and is coupled to the control section 4 (FIG. 12). An aligning layer 344 made of a aligning film such as polyimide is formed on the lower substrate 342, thus covering the two lines of segment electrodes 343. The layer 344 has been rubbed so as to orientate the molecules of liquid crystal material (later described).

Two stripe-shaped, transparent common electrodes 345 are formed on the lower surface of the upper substrate 341. The common electrodes 345 are parallel to each other, and extend over the entire length of the upper substrate 341. These electrodes 345 oppose the first and second lines of segment electrodes 343, respectively. Both common electrodes 345 are connected, at one end to the control section 4. An aligning layer 346 made of an aligning film such as polyimide is formed on the upper substrate 342, thus covering both common electrodes 345. The layer 346 has been rubbed so as to orientate the molecules of the liquid crystal material. A rectangular LC-sealing member 347 is interposed between the substrates 341 and 342 as is most clearly shown in FIG. 16. LC material is sealed in the space defined by the aligning layers 344 and 345. This LC material is nematic liquid crystal which is driven in double-frequency addressing scheme and which has the dielectric disparsion characteristics shown in FIG. 18. The LC material has the properties shown in Table 1.

TABLE 1

| N-I Point | Viscosity | , Reflective Index |
|---|---|---|
| 153.8° C. | 85.1cP (at 30° C.) | n// = 1.648 n⊥ = 1.499 Δn = 0.149 |

TABLE 1-continued

| N-I Point | Viscosity | Reflective Index |
|---|---|---|
| | | (at 23° C., 546 μm) |

The LC shutter 34 further comprises a pair of polarizing plates 348 and 349. The polarizing plate 348 is mounted on the upper or outer surface of the upper substrate 341, and the polarizing plate 349 is mounted on the lower or outer surface of the lower substrate 342. That portion of the electrodes 343, 345 where 348 at which the common electrodes 345 and the segment electrodes 343 functions as a shutter section S for transmitting or shielding light.

The LC shutter 34 further includes two electric heaters 361 for compensating the temperature of the LC material. Either heater is shaped like a strip along the series of the shutters and attached to the outer surface of the lower polarizing plate 349. These heaters 361 extend along the longer edges of the plate 349, respectively. As is shown in FIG. 14, the electric heaters 361 are connected to a temperature control circuit 362. This circuit 362 controls both heaters 361 in accordance with the signals output from a sensor 363 which detects the temperatures of LC material. The temperature of the LC material is thereby maintained at a predetermined value.

Figure 17:
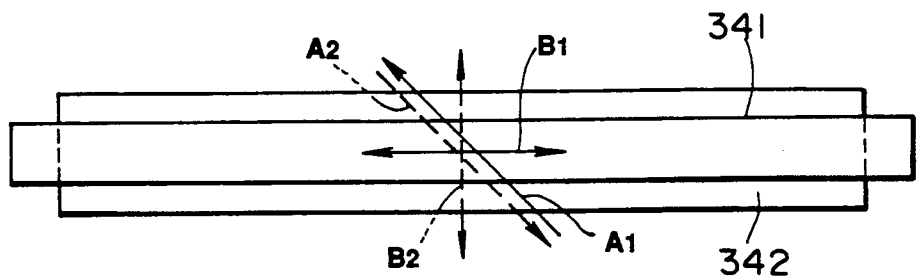
FIG. 17 is a diagram representing the positional relationship among the polarizing axes of the polarizing plates of the LC shutter shown in FIG. 14 and the directions in which aligning treatment is performed on the surfaces of aligning films.
Figure 18:
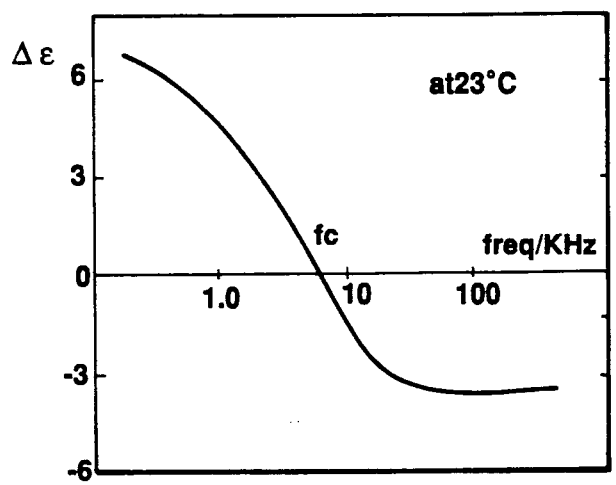
FIG. 18 is a graph showing the dielectric dispersion of the LC material used in the LC shutter shown in FIG. 14.

The directions of aligning treatment (the direction in which the aligning layers 344 and 346 are rubbed), and the light-transmitting axes of the polarizing plates 348 and 349 will be discussed. In FIG. 14 and 17, arrows A1 and A2 denote the directions of aligning treatment of the substrates 341 and 342, respectively. Also in FIGS. 14 and 17, arrows B1 and B2 represent the light-transmitting axes of the polarizing plates 348 and 349, respectively. The light-transmitting axis B1 of the light-receiving polarizing plate 348 is substantially parallel to the two lines of the segment electrodes 343. The light-transmitting axis B2 of the light-emitting polarizing plate 349 intersects with the axis B1, substantially at right angles. The directions of the aligning treatment A1 and A2 intersect at 45° with the light-transmitting axes B1 and B2. As is evident from FIG. 17, the directions A1 and A2 are opposite to each other LC molecules of the LC layer, which contact the aligning layer 346, are orientated in the direction A1 in an initial state in which no drive-field is applied. Those LC molecules of the LC layer, which contact the aligning layer 344, are orientated in the direction A2 in an initial state in which no drive-field is applied. Then the molecules of LC layer are homogeneously aligned.

The LC shutter 34, which is a birefringence type, is driven in the ½ duty, double-frequency addressing scheme. When a low-frequency electric field is applied in the gap between the segment electrodes 343 and the common electrodes 345, the moleculer of nematic liquid crystals existing between the segment electrodes 343 and common electrodes 345 in accordance with the shutter sections S are orientated upward, in the direction nearly perpendicular to the surfaces of both substrates 341 and 342. This is because the dielectric anisotropy of the nematic LC material remains positive when the low-frequency electric field is applied to the LC layer. The light, which has been linearly polarized by the light-receiving polarizing plate 348, therefore passes through the LC layer and is shielded by the light-emitting polarizing plate 349. As a result, the LC shutter 34 assumes the OFF state. When a high-frequency electric field is applied in the gap between the segment electrodes 343 and the common electrodes 345, the nematic liquid crystals are inclined to be initial states. This is because the dielectric anisotropy of the nematic LC material remains negative when the high-frequency electric field is applied to the LC layer. As the LC molecules are inclined to be initial states again, the birefringence index of the LC layer changes, allowing the light to pass through the LC layer and the light-emitting polarizing plate 349. When the LC molecules are inclined to a specific angle, the light which has passed through the plate 349 becomes bright, exhibiting substantially flat spectral distribution characteristic. Therefore, when the high-frequency electric field is applied to the LC layer during a predetermined period of time so that the light becomes bright, the LC shutter 34 assumes the ON state. Thus, the LC shutter 34 transmits light when the high-frequency electric field is applied to the LC layer during the predetermined period, and shields the light when the low-frequency electric field is applied to the LC layer.

The LC shutter 34 is driven by the method described in detail in U.S. patent application Ser. No. 066,720 filed by the inventors hereof, and performs the functions also described in the U.S. patent application.

The LC shutter 34 is heated by the light emitted from the light source 31 and also by the heaters 361 to a temperature optimal for the LC material to operate. Since the heaters 361 is elongated and extend along the alignment of the shutter sections S, the LC shutter is less heated at the longer edge portions than at the center portion close to the heaters 361. Inevitably, there is a temperature difference between the center portion and the edge portions of the LC shutter 34. This temperature difference varies with time and the ambient temperature. The temperature difference results in a temperature gradient of the substrates 341 and 342, in their widthwise direction (i.e., the direction at right angles to the two lines of the segment electrodes 343). Due to this temperature gradient, either substrate becomes anisotropic in terms of refractive index.

This refractive-index anisotropy of the substrates 341 and 342 scarcely influences the light-transmittance of the LC shutter according to this invention. This is because, as has been pointed out, the light-receiving side polarizing plate 348 is so positioned that its light-transmitting axis B1 intersects at right angles to the direction of the temperature gradient of the substrate 341, and the light-emitting polarizing plate 349 is so positioned that its light-transmitting axis B2 extends parallel to the directions of the temperature gradients of both substrates 341 and 342.

Figure 19:
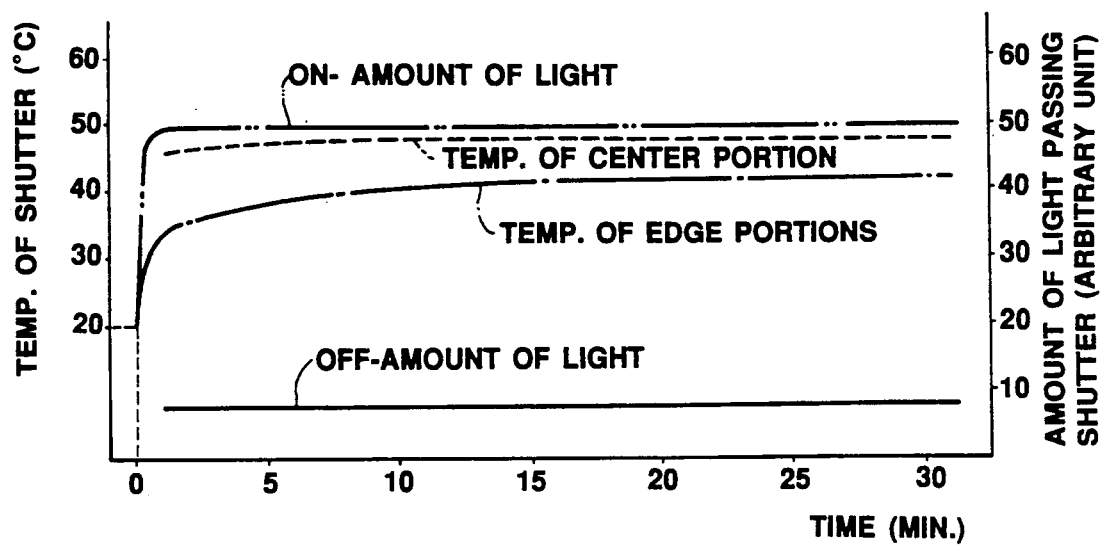
FIG. 19 is also a graph illustrating the how the ON-amount of light and OFF-amount of light, both emitted by the LC shutter shown in FIG. 14, varies with time.

FIG. 19 represents how the ON-amount of light, the OFF-amount of light, the temperatures of the center portion and the edge portions of the LC shutter, wherein the light-transmitting axes B1 and B2 of the plates 348 and 349 are parallel to the longer axis of the substrates 341 and 342, vary with time when the LC shutter is in the ON state and the LC material is heated to 50° C. and when the ambient temperature is 20° C. The data shown in this figure was obtained by repeatedly and repeatedly applying the high- and the low-frequency electric field alternately to the layer, thereby turning on, by continuously applying the low-frequency electric field to the layer thereby turning off the shutter sections S, and by measuring the ON-amount of light and the OFF-amount of light which the LC shutter passed as its shutter sections S were turned on and off.

As can be understood from FIG. 19, the OFF-amount of light remains almost unchanged even when the temperature difference between the center portion and the edge portions of either substrate. Also, as is evident from FIG. 19, the ON-amount of light varies very little with time. Therefore, the contrast of the image formed by using the LC shutter will scarcely change. Obviously, the LC shutter operates quite stably despite the changes of the ambient temperature.

The LC shutter described above is provided with the heaters 361 for heating the LC layer. Nonetheless, the present invention is not limited to the embodiment described above. The invention can apply to an LC shutter without such heaters, wherein the light emitted from a light source heats the LC layer, thus causing a temperature gradient. Also in this case, the same advantages are achieved as in the embodiment described above. Further, the light-transmitting axis B2 of the light-emitting side polarizing plate 349 need not intersect with the light-transmitting axis B1 of the light-receiving polarizing plate 348, as in the embodiment described above. The axis B2 can be substantially parallel to the axis B1, in which case the low- and the high-frequency electric field are used as ON electric field and OFF electric field, respectively. Still further, the axis B1 need not be parallel to the two rows of the segment electrodes 343, which intersect at about right angles to the direction of the temperature gradient of both substrates 341 and 342, as in the embodiment described thus far. The axis B1 can be parallel to the direction of the temperature gradient. If this is the case, the linearly polarized light, which has passed through the light-receiving side polarizing plate 348, is applied to the LC layer without undergoing the influence of birefringence while passing through the upper substrate 341. And in the OFF state, the light from the LC layer is almost completely shielded by the light-emitting side polarizing plate 349 since it goes not undergo the influence of birefringence while passing through the lower substrate 342. Hence, neither the ON-amount of light nor the OFF-amount of light is influenced by the birefringence indexes of the substrates 341 and 342.

Therefore, according to the present invention, the direction B1 can intersect substantially at right angles to the direction in which the segment electrodes 343 are aligned, i.e., the widthwise direction of the substrates 341 and 342. If this is the case, the light-transmitting axis B2 of the light-emitting side polarizing plate 349 extends either at right angles or parallel to the axis B1 of the light-receiving polarizing plate 348, and the directions A1 and A2 of the aligning treatment of the substrates 341 and 342 intersect at about 45 with the light-transmitting axes B1 and B2.

Figure 20:
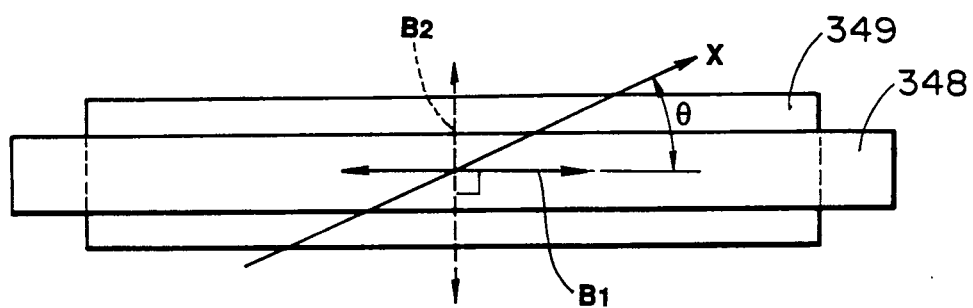
FIG. 20 is a plan view of another LC shutter according to the invention, showing the positional relationship between the axes of the polarizing plates and the directions in which aligning treatment is subjected on the surfaces of aligning films.
Figure 21:
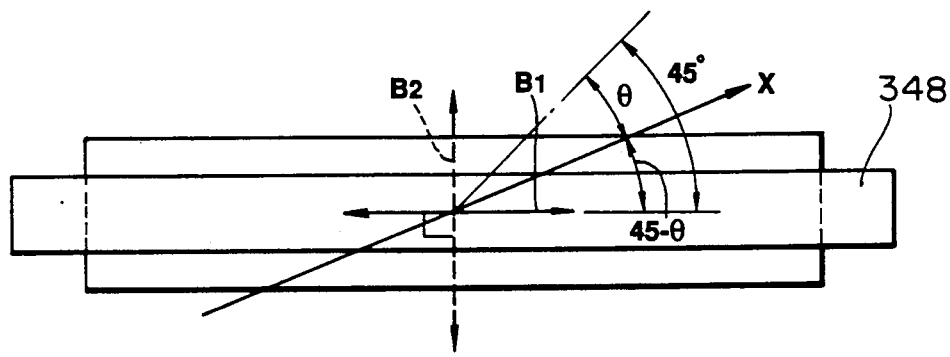
FIG. 21 is a plan view of still another LC shutter according to the invention, showing the positional relationship between the axes of the polarizing plates and the directions in which aligning treatment is performed on the surfaces of aligning films on the substrates.

Moreover, the present invention appear not only to a birefringent LC shutter, but also to a ferroelectric LC shutter which uses ferroelectric liquid crystal having chiral smectic C phase. In the case of a ferroelectric LC shutter, it suffices to determine the directions of the aligning treatment A1 and A2 such that the helical axis X of the ferroelectric liquid crystal material must intersect with the light-emitting axes B1 and B2 at the tilt angle $\theta$ of the LC molecules as is shown in FIG. 20, or at $45° = \theta$ as is illustrated in FIG. 21.

What is claimed is:
1. A liquid crystal shutter, comprising:
a liquid crystal element having a first substrate, a plurality of first electrodes formed on one surface of the first substrate, first aligning means formed on the electrodes, a second substrate located parallel to the first substrate, at least one second electrode formed on that surface of the second substrate which opposes the at least one of the first electrodes, second aligning means formed on the second electrode, and liquid crystal material sealed in the gap between the first and the second substrates, liquid crystal molecules of which are arranged in a direction predetermined by the first and the second aligning means;

light source means for applying light to the liquid crystal element;

heating means for heating the liquid crystal element; and a pair of polarizing means arranged outside the liquid crystal element, a polarization axis of at least one of said polarizing means being substantially parallel or orthogonal to a direction of an optical axis of a respective one of said substrates having an optical anisotropy caused by a temperature gradient created over the liquid crystal element in a direction toward a periphery from a center of the liquid crystal element heated by said heating means, and crossing at a certain degree with an arrangement direction of said liquid crystal molecules oriented by said aligning means.

2. A liquid crystal shutter according to claim 1, wherein said heating means is heater located near said liquid crystal element.

3. A liquid crystal shutter according to claim 2, wherein said heater is located outside said liquid crystal element and extends in the lengthwise direction thereof.

4. A liquid crystal shutter according to claim 1, wherein said heating means comprises a heater extending in the lengthwise direction of said liquid crystal element, temperature-detecting means for detecting the temperature of said liquid crystal material, and control means for controlling the thermal output of the heater.

5. A liquid crystal shutter according to claim 1, wherein said light source means includes a halogen lamp for emitting unpolarized light.

6. A liquid crystal shutter according to claim 1, wherein said light source means comprises a halogen lamp and light guide means for guiding the light from the halogen lamp to said liquid crystal element.

7. A liquid crystal shutter according to claim 6, wherein said light guide means extends in the lengthwise direction of said liquid crystal element, and guides the light from said halogen lamp and distributes the light uniformly over the entire length of said liquid crystal element, so that unpolarized light is applied onto said liquid crystal element.

8. A liquid crystal shutter according to claim 1, wherein said first aligning means and said second aligning means orientate molecules of the liquid crystal in a line intersecting at a desired angle to the polarizing axis of at least one of said polarizing means, so that when an electric field is applied to the liquid crystal material, the birefringence index of the liquid crystal material is changed, thereby to control the polarization of the light applied from said light source.

9. A liquid crystal shutter according to claim 8, wherein said first and second aligning means orientate the molecules of the liquid crystal in a line intersecting at 45° to the polarizing axis of at least one of said polarizing plates.

10. A liquid crystal shutter according to claim 1, wherein said first and second aligning means each comprise an aligning layer which has been rubbed, the layers of said first and second aligning means having been rubbed in a direction which intersects at about 45° with the polarizing axis of at least one of said polarizing plates.

11. A liquid crystal shutter according to claim 1, wherein the polarizing axes of said polarizing plates extend either substantially parallel or substantially at right angles to each other.

12. A liquid crystal shutter according to claim 1, wherein said liquid crystal is of a type which is driven in double-frequency scheme and which has such dielectric dispersion characteristic that polarity of the dielectric-constant anisotropy of the liquid crystal material is reversed when a high- and a low-frequency electric field are applied to said liquid crystal.

13. A liquid crystal shutter according to claim 1, wherein said liquid crystal is ferroelectric liquid crystal material.

14. A liquid crystal shutter according to claim 13, wherein said first and second aligning means orientate said ferroelectric liquid crystal material, so that the helical axis of said ferroelectric liquid crystal material intersects at the tilt angle of the liquid crystal molecules with the polarizing axis of at least one of said polarizing plates.

15. A liquid crystal shutter according to claim 13, wherein said first and second aligning means orientate said ferroelectric liquid crystal material, so that the helical axis of said ferroelectric liquid crystal material intersects at an angle with the polarizing axis of at least one of said polarizing plates, said angle being the difference between 45° and the tilt angle of the liquid crystal molecules.

16. A liquid crystal shutter according to claim 1, wherein said liquid crystal element has a number of shutter elements arranged in at least two lines parallel to the lengthwise direction of said liquid crystal element, each shutter element comprising a electrodes formed on said first and second substrates, and a portion of the liquid crystal material between the electrodes formed on said first and said second substrate.

17. A liquid crystal shutter according to claim 16, wherein said liquid crystal element has a width and a length far longer than the width.

18. A liquid crystal shutter, comprising:
light source means;
a liquid crystal element having a first substrate, a plurality of first electrodes formed on one surface of the first substrate, first aligning means formed on the electrodes, a second substrate located parallel to the first substrate, at least one second electrode formed on that surface of the second substrate which opposes at least one of the first electrodes, second aligning means formed on the second electrode, and liquid crystal material sealed in the gap between the first and the second substrates, liquid crystal molecules of which are arranged in a direction predetermined by the first and second aligning means; and
a pair of polarizing means arranged outside the liquid crystal element, a polarization axis of at least one of said polarizing means being substantially parallel or orthogonal to a direction of an optical axis of a respective one of said substrates having an optical anisotropy caused by a temperature gradient created over the liquid crystal element in a direction toward a periphery from a center of the liquid crystal element heated by said light source means, and crossing at a certain degree with an arrangement direction of said liquid crystal element oriented by said aligning means.

19. A liquid crystal shutter according to claim 18, wherein said light source means has a halogen lamp for emitting visible light and heat rays.

20. A liquid crystal shutter according to claim 18, wherein said first aligning means and said second aligning means orientate molecules of the liquid crystal in a line intersecting at a desired angle to the polarizing axis of at least one of said polarizing means, so that when an electric field is applied to the liquid crystal, the birefringence index of the liquid crystal material is changed, thereby to control the polarization of the light applied from said light source means.

* * * * *